United States Patent [19]

Watanabe et al.

[11] Patent Number: 5,091,874

[45] Date of Patent: Feb. 25, 1992

[54] ENCODER APPARATUS

[75] Inventors: Yukari Watanabe; Yuichi Saito, both of Itami, Japan

[73] Assignee: Mitsubishi Denki Kabushiki Kaisha, Tokyo, Japan

[21] Appl. No.: 210,968

[22] Filed: Jun. 24, 1988

[30] Foreign Application Priority Data

Jun. 30, 1987 [JP] Japan ................................ 62-164325

[51] Int. Cl.$^5$ .............................................. G06F 7/38
[52] U.S. Cl. ................................ 364/715.1; 364/736; 364/746; 364/736.5
[58] Field of Search ... 364/200 MS File, 900 MS File, 364/736, 736.5, 715, 746

[56] References Cited

U.S. PATENT DOCUMENTS

| | | | |
|---|---|---|---|
| 3,833,888 | 9/1974 | Stafford et al. | 340/172.5 |
| 4,028,684 | 6/1977 | Divine et al. | 340/172.5 |
| 4,035,780 | 7/1977 | Kristick et al. | 364/900 |
| 4,037,094 | 7/1977 | Vandierendonck | 235/175 |
| 4,064,421 | 12/1977 | Gajski et al. | 364/716 |
| 4,335,372 | 6/1982 | Aufderheide et al. | 340/347 DD |
| 4,348,741 | 9/1982 | McAlister et al. | 364/900 |
| 4,396,994 | 8/1983 | Kang et al. | 364/900 |
| 4,420,806 | 12/1983 | Johnson, Jr. et al. | 364/200 |
| 4,583,197 | 4/1986 | Chappell et al. | 364/900 |
| 4,631,696 | 12/1986 | Sakamoto | 364/748 |
| 4,653,019 | 3/1987 | Hodge et al. | 364/900 |
| 4,670,858 | 6/1987 | Almy | 364/200 |
| 4,703,419 | 10/1987 | Krause et al. | 364/200 |
| 4,760,461 | 7/1988 | Sato | 358/261 |
| 4,760,517 | 7/1988 | Miller et al. | 364/200 |
| 4,761,732 | 8/1988 | Eldumiati et al. | 364/200 |
| 4,773,033 | 9/1988 | Ikumi | 364/715.1 |
| 4,785,393 | 11/1988 | Chu et al. | 364/200 |
| 4,785,421 | 11/1988 | Takahashi et al. | 364/715.04 |
| 4,789,956 | 12/1988 | Hildebrandt | 364/736.5 |
| 4,799,154 | 1/1989 | Matthews et al. | 364/200 |
| 4,829,460 | 5/1989 | Ito | 364/715 |
| 4,922,446 | 5/1990 | Zurawski et al. | 364/748 |
| 4,924,421 | 5/1990 | Seguchi | 364/715.1 |
| 4,954,978 | 9/1990 | Terane et al. | 364/715 |
| 4,959,811 | 9/1990 | Szczepanek | 365/49 |

OTHER PUBLICATIONS

"Switching and Finite Automata Theory", pp. 124-127, A. Kohavi, Tata McGraw-Hill Publishing Company Ltd., New Delhi, India 1978.

Primary Examiner—Allen R. MacDonald
Assistant Examiner—C. Shin
Attorney, Agent, or Firm—Townsend and Townsend

[57] ABSTRACT

A high-speed encoding apparatus retrieves the bit position of either one of the lowest order bit or the highest order bit having a first logical value. Such retrieving starts from a selected bit-position. The selected bit-position is defined by an input offset value Iofs4:Iofs0. The retrieved bit-position is the output of the encoder Oofs4:Oofs0. A zero detection circuit receives an n-bit data word, segments the n-bits into groups of predetermined length and for each group generates a zero detection when all bits in the group are zero. The zero detection circuit also masks the zero detections according to the high order bit states of the input offset value. A first encoder then generates the high order bits of the apparatus output offset in response to the masked and unmasked zero detections. A second encoder masks one or more of the groups according to the bit states of the input offset value, then generates encoded bit sets for each group. The high order bits of the output offset previously generated then are used to select which of the bit sets are used as the low order bits of the output offset.

5 Claims, 6 Drawing Sheets

| Iofs 4 | Iofs 3 | MASKED data |
|--------|--------|-------------|
| 0 | 0 | NOTHING |
| 0 | 1 | data 1 |
| 1 | 0 | data 1, data 2 |
| 1 | 1 | data 1, data 2, data 3 |

| Iofs 4 | Iofs 3 | data MASKED BY THREE BITS |
|--------|--------|---------------------------|
| 0      | 0      | data 1                    |
| 0      | 1      | data 2                    |
| 1      | 0      | data 3                    |
| 1      | 1      | data 4                    |

| Oofs 4 | Oofs 3 | OUTPUT OFFSET VALUE |
|--------|--------|---------------------|
| 0      | 0      | M1                  |
| 0      | 1      | M2                  |
| 1      | 0      | M3                  |
| 1      | 1      | M4                  |

ENCODER APPARATUS

BACKGROUND OF THE INVENTION

1. Field of the Invention

This invention relates to a semiconductor logical circuit, and more particularly to a semiconductor encoder apparatus logical circuit which retrieves a bit holding a first logical "1" from the high order or the low order of data of, for example, 32-bit size, thereby encoding at high speed the retrieved result to produce an output offset value of, for example, binary digit 5-bit.

2. Description of the Prior Art

A conventional microprocessor includes a semiconductor logic circuit (e.g., encoder) for encoding data of, for example, 32-bit size, by eliminating an input offset value.

FIG. 1 is a flow chart showing the operation of a conventional encoding apparatus, and FIG. 2 is a schematic block diagram thereof.

At first, explanation will be given on encoding the data of 32-bit size. The data of 32-bit size is outputted from a data bus 1 and given to a barrel shifter 22. The barrel shifter 22 logically shifts the data of 32-bit size rightwardly to an extent of input offset value, thereby omitting a part to be masked. Next, the barrel shifter 22 now logically shifts the rightwardly shifted data leftwardly to an extent of input offset value. Therefore, the masked portions entirely become logical "0". Thus, the data omitting therefrom the masked portions is given to an encoder 21 through the data bus 1 and encoded therewith, so that a logical "1" is retrieved from the input offset value with respect to the high order data.

In the aforesaid conventional semiconductor logical circuit, masking of data of 32-bit size is carried out by use of the barrel shifter 22, whereby it takes three steps to carry out encoding (refer to FIG. 1), thereby creating a problem in that the processing speed becomes slow.

SUMMARY OF THE INVENTION

In order to solve the above problem, the present invention has been designed. According to an encoding apparatus of the invention, data of n-bit size is masked by the high order several bits and by the remaining low order several bits of an input offset value separately and the data of n-bit size is divided at several bits so that every divided data is encoded.

A first object of this invention is to provide an encoding apparatus which can perform masking by an input offset value at high speed with respect to data of n-bit width.

A second object of this invention is to provide an encoding apparatus which can encode at high speed to a predetermined offset value the retrieved result of a first logical bit from the high order or the low order of data of n-bit size.

The above and further objects and features of the invention will more fully be apparent from the following detailed description with accompanying drawings.

DESCRIPTION OF THE PREFERRED EMBODIMENTS

Figure 1:
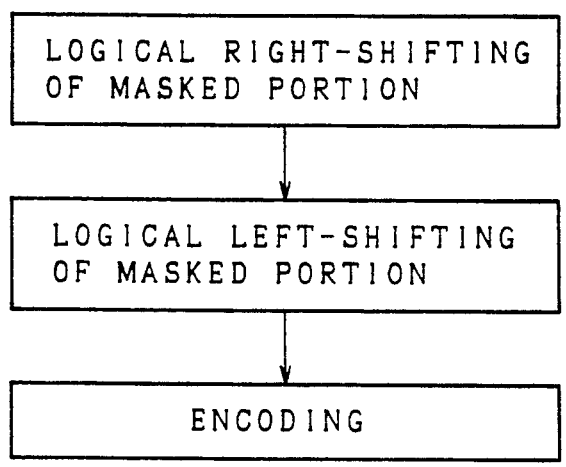
FIG. 1 is a flow chart explanatory of operation of the conventional encoder semiconductor logical circuit.
Figure 2:
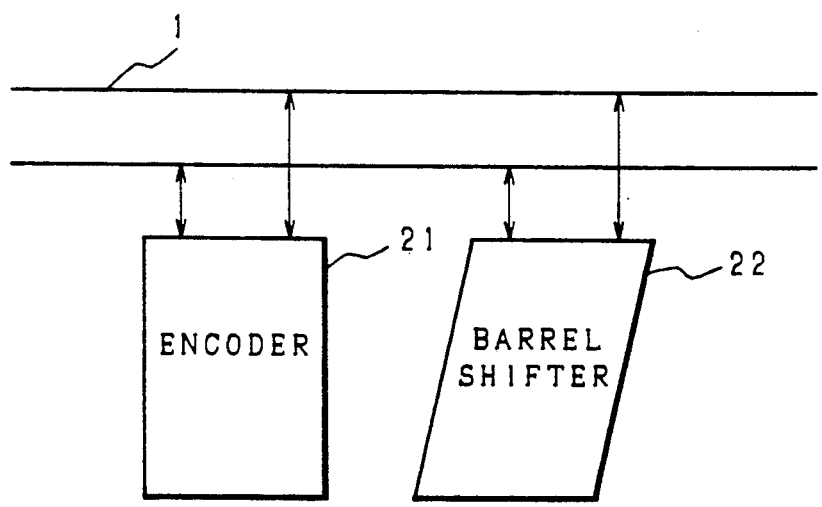
FIG. 2 is a schematic block diagram of the conventional encoder semiconductor logical circuit.
Figures 3, 4:
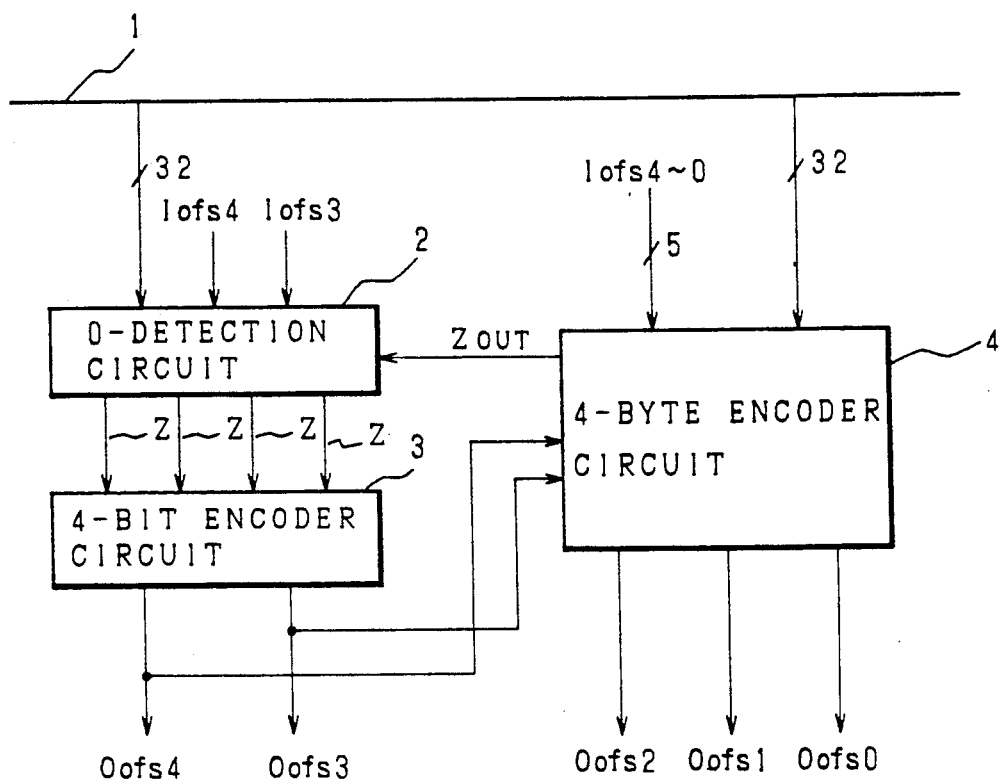
FIG. 3 is a schematic block diagram of an embodiment of an encoding apparatus according to this invention.
FIG. 4 is a table showing the high order two bits of an input offset value and data masked at that time.

Referring to FIG. 3 of block diagram of an embodiment of the invention, an embodiment of a semiconductor encoder circuit of the invention will be described, which serves to retrieve a logical "1" from the low-order bit to the high-order bit. A data bus 1 has a 32-bit size so that data of 32-bit size is given to a 0-detection circuit 2 and a 4-byte encoder circuit 4, the 0-detection circuit 2 dividing the data of 32-bit size into each byte of 8-bits and detecting whether or not the data of each byte is entirely a logical "0". A 0-detection signal Z of the 0-detection circuit 2 is given to a 4-bit encoder circuit 3. The 4-bit encoder circuit 3 retrieves a first logical "1" from the high order of 0-detection signal of the 4-bits outputted from the 0-detection circuit 2 and outputs the retrieved result through binary digit two-bits. A 4-byte encoder circuit 4 encodes the 8-bit data four-divided from the 32-bit data.

In addition, the 4-byte encoder circuit 4 delivers to the 0-detection circuit 2 a signal Z OUT showing all bits of the data in the bytes are logical "0" after masking. The 4-byte encoder circuit 4 is given a 5-bit input offset values $I_{ofs}$ 0 through 4, the 0-detection circuit 2 being given the input offset values $I_{ofs}$ 4 and $I_{ofs}$ 3.

FIG. 4 is a table shows the high-order two bits of the input offset value shown in FIG. 3 and data masked at that time. In FIG. 4, the data of every 8-bits obtained by 4-dividing the 32-bit data is represented in the downward order by data 4, data 3, data 2 and data 1.

Figure 5:
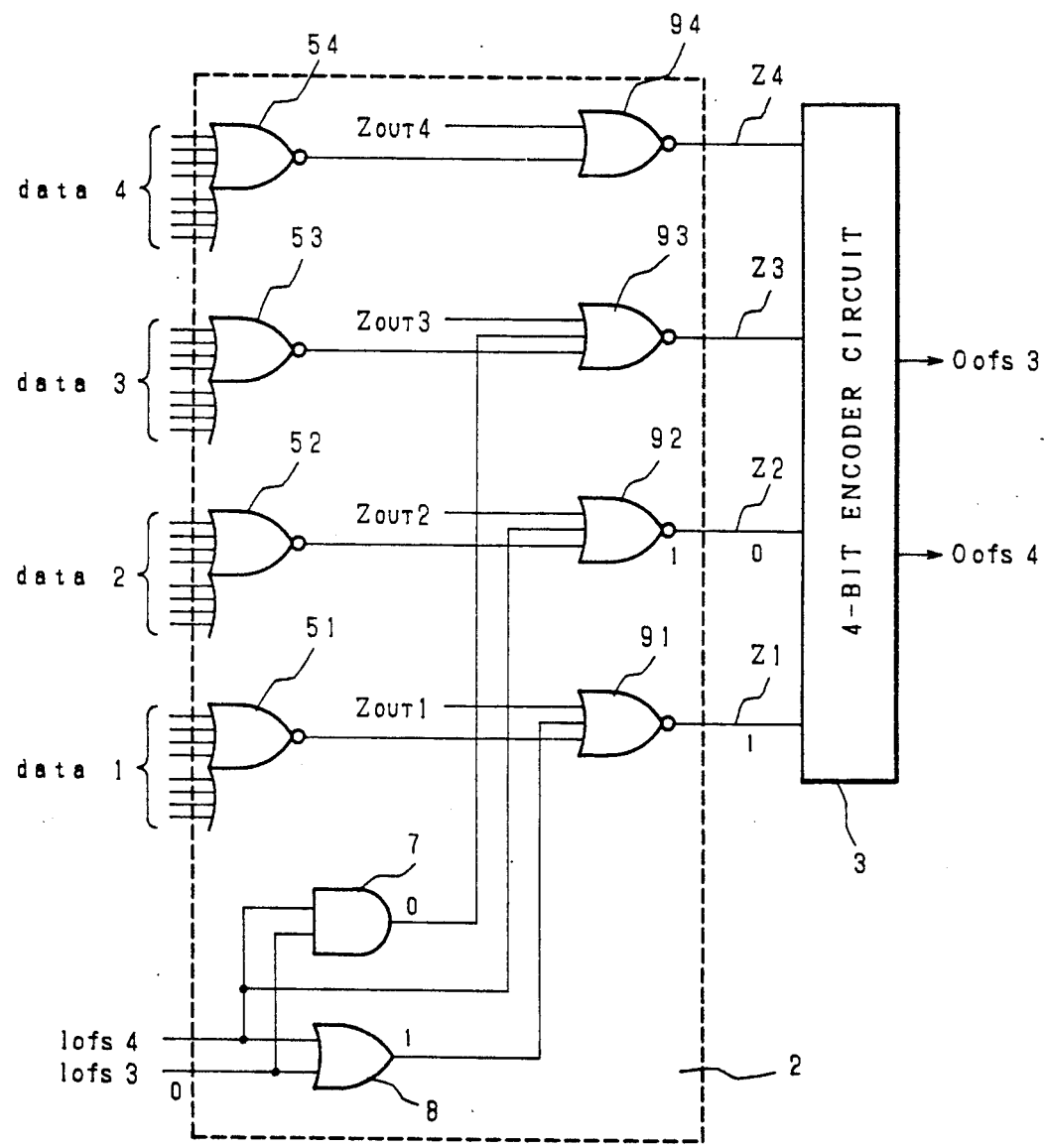
FIG. 5 is an electrical circuit diagram of an embodiment of the 0-detection circuit shown in FIG. 3.

FIG. 5 is a concrete electric circuit diagram of the 0-detection circuit shown in FIG. 3. In FIG. 5, the data at each 8-bits: data 4 through 1, are given to 8-input NOR gates 54 through 51 respectively. These 8-input NOR gates 54 through 51, when all bits of the 8-bit data is a logical "0", output logical "1" respectively, the 0-detection signal being given to the 4-bit encoder circuit 3 through NOR gate 94 through 91, the signals Z OUT 4 through 1 being given thereto. The signals Z OUT 4 through 1 become logical "0" when all the data are logical "0" or masked. An AND gate 7 and an OR gate 8 are given input offset values $I_{ofs}$ 4 and 3 of the high order 2-bits. An output of AND gate 7 is given to the NOR gate 93 to mask the data 3, the input offset value $I_{ofs}$ 4 being given to the NOR gate 92 to mask the data 2. The output of OR gate 8 is given to the NOR gate 91 to mask the data 1. The outputs Z4 through Z1 of the NOR gate 94 through 91 correspond to the 0-detected result of the data 4 through 1, and are given to the 4-bit encoder circuit 3 respectively.

Figure 6:
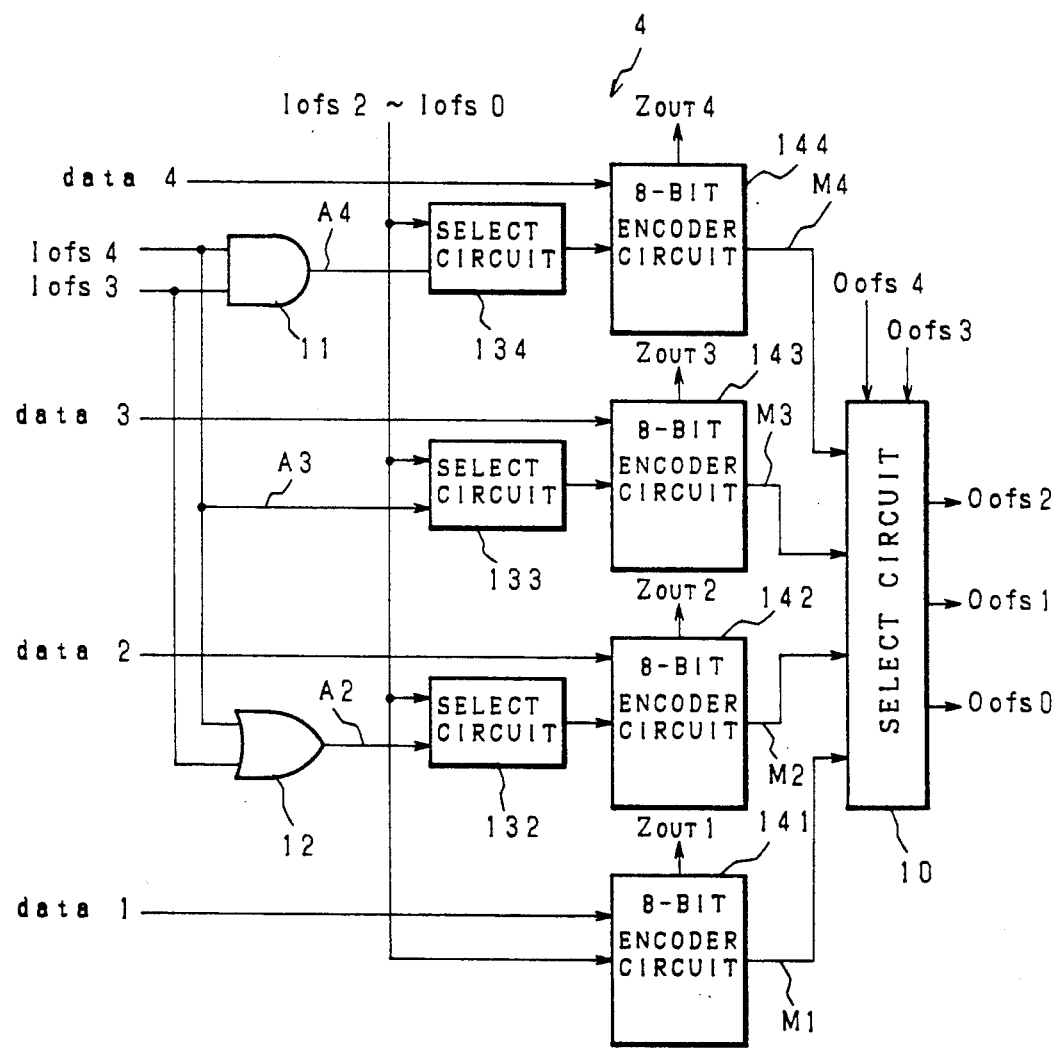
FIG. 6 is an electrical circuit diagram of an embodiment of a 4-byte encoder circuit shown in FIG. 3.
Figures 7, 9, 10:
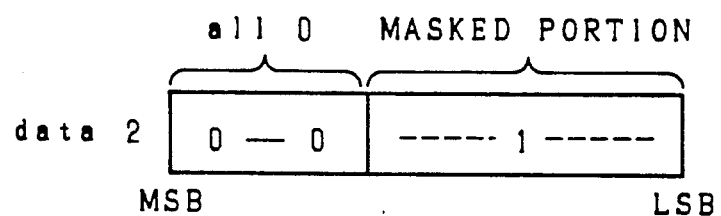
FIG. 7 is a table showing the high order two bits of an input offset value and data masked by the low order 3-bits of the same.
FIG. 9 shows data of 8-bit size in a case where a logical "1" is included in the masked portion and a logical "0" in the entire not-masked portion.
FIG. 10 is a table showing an output offset value of the high-order two bits at a 4-bit encoder circuit and the encoded result of data at every 8-bits selected at the time.
Figure 8:
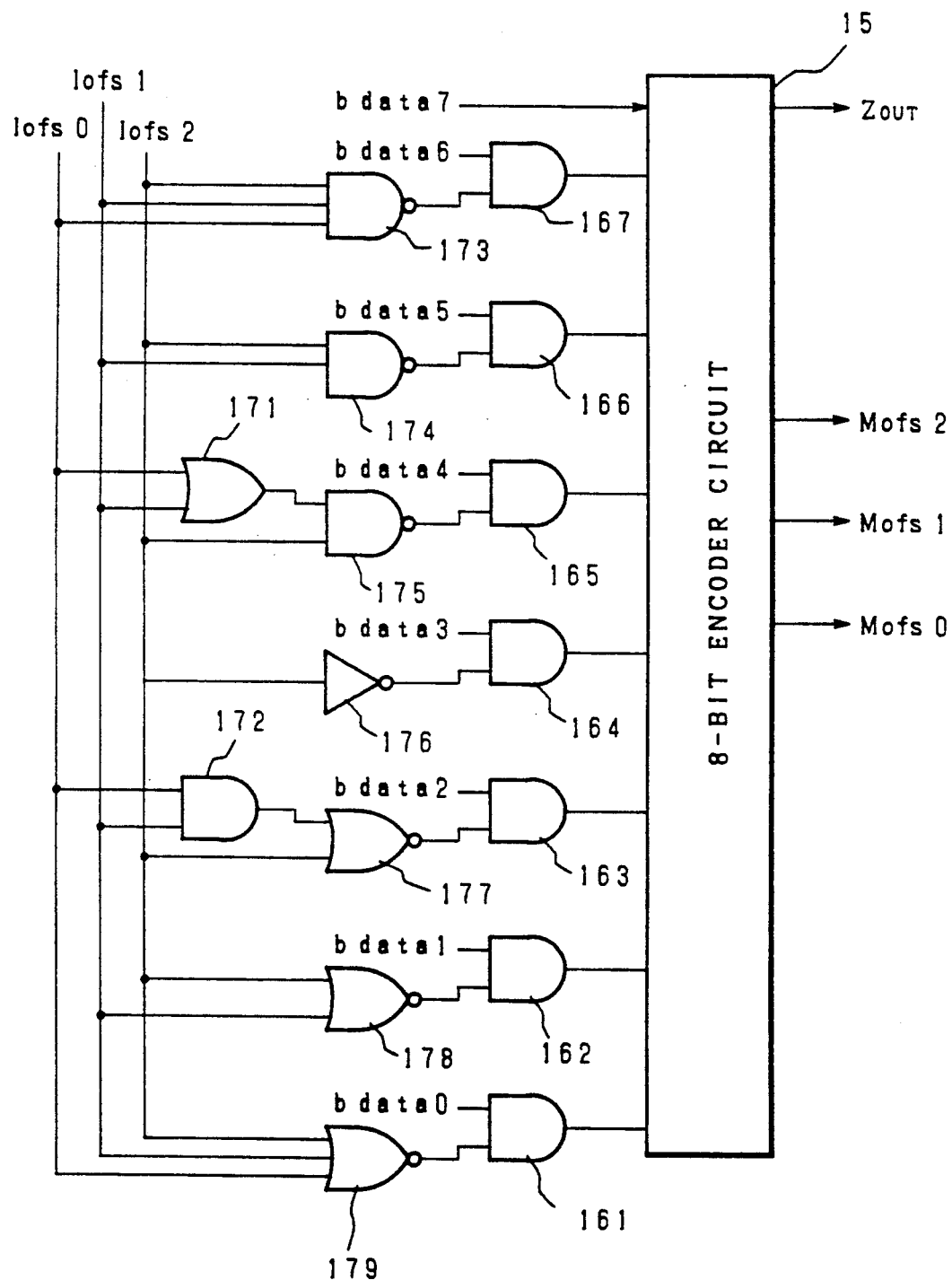
FIG. 8 is an electrical circuit diagram of an embodiment of the encoder circuit shown in FIG. 6.

FIG. 6 is a concrete electric circuit diagram of the 4-byte encoder circuit shown in FIG. 3, and FIG. 7 shows the state where the high-order two bits of the input offset value and the data at that time are masked by the low-order three bits. FIG. 8 shows a concrete structure of the encoder circuit shown in FIG. 6.

Next, explanation will be given on structure of a byte encoder circuit with reference to FIGS. 6 through 8. The input offset values $I_{ofs}4$ and $I_{ofs}3$ of the high order two bits are given to an AND gate 11 and an OR gate 12 respectively, the input offset value $I_{ofs}4$ also being given to a select circuit 133. The output of AND gate 11 is given to a select circuit 134, the output of OR gate 12 being given to a select circuit 132. The select circuits 134 through 132, when the corresponding input signals A4, A3 and A2 are logical "1", output the input offset values $I_{ofs}2$ through $I_{ofs}0$ of the input offset values of the low order 3-bits, and when A4, A3 and A2 are logical "0", output logical "0", which are given to the encoder circuits 144, 143 and 142 respectively.

The encoder circuits 144 through 141 are given data 4 through 1 respectively. The encoder circuit 141 is given the input offset values $I_{ofs}2$ through 0 of the low-order 3-bits directly not-through the select circuit. The encoder circuits 144 through 141 mask the 8-bit data 4 through 1 and retrieve the first logical "1" from the high order and output the retrieved result at 3-bits. In addition, outputs M4 through M1 issued from the encoder circuits 144 through 141 are 3-bit offset values indicating the encoded result of the 8-bit data 4 through 1. The select circuit 10 selects one of M4 through M1 on the basis of the 2-bit output offset values $O_{ofs}4$ and $O_{ofs}3$.

Next, explanation will be given on a concrete structures of the select circuits and encoder circuits shown in FIG. 6 with reference to FIG. 8. b data 7 through 0 are 8-bit data and the b data 7 is the highest order bit and the b data 0 is the lowest order bit. The 8-bit data: b data 7 is given directly to an 8-bit encoder circuit 15, the b data 6 through 0 being given to the 8-bit encoder circuit 15 through AND gates 167 through 161. The AND gates 167 through 161 are given the low order 3-bit input offset values $I_{ofs}0$ through 2 through an OR gate 171, and AND gate 172, NAND gates 173 through 175, an inverter 176, and NOR gates 177 through 179 respectively. The AND gates 167 through 161 make the bits at the portions to be masked of b data 6 through 0 to be a logical "0" on the basis of either of the input offset values $I_{ofs}0$ through $I_{ofs}2$. The 8-bit encoder circuit 15 encodes the inputted 8-bit data and outputs the 3-bit encoded results $M_{ofs}2$ through $M_{ofs}0$. Also, the 8-bit encoder circuit 15, when the inputs are entirely logical "0", outputs the signal Z OUT.

FIG. 9 shows data when the portion to be masked at the 8-bit data has a logical "1" and that not to be masked is entirely a logical "0", and FIG. 10 shows the high order two bit output offset values $O_{ofs}4$ and $O_{ofs}3$ and which one of encoded result of the data at every 8-bits at that time is selected.

Next, operation of an embodiment of the encoding apparatus is described with reference to FIGS. 3 through 10. As shown in FIG. 3, the 32-bit data is inputted to the 0-detection circuit 2 and 4-byte encoder circuit 4. At the 0-detection circuit 2, as shown in FIG. 5, the 32-bit data is given at every 8-bits to the 8-bit input NOR gates 54 through 51. In a case where all bit of the respective data is a logical "0", the outputs of the respective 8-input NOR gates 54 through 51 go to logical "1". The respective NOR gates 93 through 91, which are given the input of logical 1 by the high order 2-bit input offset values $I_{ofs}4$ and $I_{ofs}3$, deliver to the 4-bit encoder circuit 3 the respective inputs Z3 through Z1 each going to logical "0".

In other words, the high order 2-bit output offset values $O_{ofs}4$ and $O_{ofs}3$ are decided as if the data at the portion is entirely logical "0". For example, when the high order 2-bit input offset values $I_{ofs}4=1$ and $I_{ofs}3=0$ are deemed, the input signals Z1 and Z2 to the 4-bit encoder circuit 3 both go to logical "0", the data 1 and data 2 are masked, and the high order 2-bit output offset values $O_{ofs}4$ and $O_{ofs}3$ go to logical "10" or "11" in binary numeral.

Simultaneously, it will be described with reference to FIG. 6 that the low order 3-bit input offset values $I_{ofs}2$ through $I_{ofs}0$ perform the masking of data at each 8 bits. At first, the high order 2-bit input offset values $I_{ofs}4$ and $I_{ofs}3$ select which data to be masked. Therefore, as shown in FIG. 7, for the signals A4 through A2 in FIG. 6 going to logical "1", the input offset values $I_{ofs}2$ through $I_{ofs}0$ are inputted from the select circuits 134 through 132 to the encoder circuits 144 through 142.

The encoder circuits 144 through 141, as shown in FIG. 8, mask the b data 7 through 0 of 8-bit data on the basis of the 3-bit input offset values $I_{ofs}2$ through $I_{ofs}0$. The 8-bit data after masked is given to the 8-bit encoder circuit 15 and retrieved of logical "1" from the high order and then the encoded result as the 3-bit output offset values $M_{ofs}2$ through $M_{ofs}0$. At this time, if the masked results are entirely logical "0", the Z OUT signal of logical "1" is outputted. Also, as shown in FIG. 10, one of the offset values M4 through M1 is selected corresponding to the high order 2-bits $O_{ofs}4$ and $O_{ofs}3$ of the output offset values, whereby the low order 3 bits $O_{ofs}2$, $O_{ofs}1$ and $O_{ofs}0$ are outputted.

For example, in a case of the high order 2-bits $I_{ofs}4=0$ and $I_{ofs}3=1$, the data 2 is masked by the low order 3-bits $I_{ofs}2$, $I_{ofs}1$ and $I_{ofs}0$ of the input offset values and the result of encoded offset value M2 is outputted. At this time the output signal Z OUT is issued, as shown in FIG. 9, in a case where there is logical "1" in a masked portion and a non-masked portion is entirely logical "0", and the signal Z OUT is given to the 0-detection circuit 2 as shown in FIG. 3. In this case, the signal Z OUT is inputted to the NOR gate 92 in FIG. 5 so that an output Z2 of NOR gate 92 is a logical "1", whereby the 4-bit encoder circuit 3 makes the low order 2 bits of input data to be a logical "0", thereby deciding the high order 2 bits $O_{ofs}4$ and $O_{ofs}3$ of the output offset values.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. An encoding apparatus receiving an input offset value and an n-bit word, the n-bit word being segmented into a plurality of groups of predetermined bit-length, the apparatus generating an i-bit output offset value which defines a bit position within the n-bit word corresponding to either one of a lowest order bit or a highest order bit having a first logical value, the i-bit output offset value having x high-order bits and y low-order bits, the apparatus comprising:

means receiving said plurality of groups of said n-bit word for detecting for each one group of said plurality of groups whether all bits of said one group correspond to a second logical value, said detecting means generating an indicator signal for each said one group each respective indicator signal indicating whether all bits of the corresponding said one group correspond to said second logical value;

first encoding means receiving the indicator signal for each said one group for generating the x high-order bits of the output offset value in response to said indicator signals;

second encoding means receiving said plurality of groups for encoding each one of said plurality of groups into a respective encoded bit set, resulting in a plurality of encoded bit sets;

means for selecting one set of the plurality of encoded bit sets in response to said x high-order bits, said selected bit set defining the y low-order bits of said output offset value.

2. The apparatus of claim 1 in which said input offset value is for defining select bit positions of said n-bit word, in which said output offset value is for defining a bit position of either one of a lowest order bit or a highest order bit of said select bit positions having a first logical value, in which said input offset value has g high-order bits, and further comprising:

first means for masking an indicator signal in response to said g high-order bits, said first encoding means responding to said masked indicator signal.

3. The apparatus of claim 2 in which said second encoding means comprises:

second means for masking a group of said plurality of groups in response to said input offset value; and third encoding means for encoding said masked group into an encoded bit set.

4. An encoding apparatus receiving an input offset value and an n-bit word, the n-bit word being segmented into a plurality of groups of predetermined bit-length, the input offset value defining prioritized bit positions of said n-bit word, the apparatus generating an i-bit output offset value which defines a bit position of either one of a lowest order prioritized bit or a highest order prioritized bit having a first logical value, the i-bit output offset value having x high-order bits and y low-order bits, the input offset value having g high-order bits, the apparatus comprising:

means receiving said plurality of groups of said n-bit word for detecting for each one group of said plurality of groups whether all bits of said one group correspond to a second logical value, said detecting means generating an indicator signal for each said one group each respective indicator signal indicating whether all bits of the corresponding said one group correspond to said second logical value;

means for masking at least one of said indicator signals in response to the g high-order bits of said input offset value to generate at least one masked indicator signal, any remaining indicator signal which is not masked being an unmasked indicator signal;

first encoding means receiving the indicator signal for each said one group for generating the x high-order bits of the output offset value in response to said masked and unmasked indicator signals;

second encoding means receiving said plurality of groups and said input offset value for encoding each one of said plurality of groups into a respective encoded bit set, resulting in a plurality of encoded bit sets;

means for selecting one set of the plurality of encoded bit sets in response to said x high-order bits, said selected bit set defining the y low-order bits of said output offset value.

5. The apparatus of claim 4 in which said second encoding means comprises:

second means for masking a group of said plurality of groups in response to said input offset value; and third encoding means for encoding said masked group into an encoded bit set.

* * * * *